United States Patent [19]
Lehman

[11] 3,938,354
[45] Feb. 17, 1976

[54] APPARATUS FOR TRANSMITTING ROTATIONAL ENERGY FROM A MOTOR TO THE ROTOR OF A CENTRIFUGE

[75] Inventor: Ivan L. Lehman, Contoocook, N.H.

[73] Assignee: Damon Corporation, Needham Heights, Mass.

[22] Filed: Mar. 20, 1973

[21] Appl. No.: 343,042

Related U.S. Application Data

[63] Continuation-in-part of Ser. No. 201,069, Nov. 22, 1971, Pat. No. 3,779,451.

[52] U.S. Cl. .................. 64/1 V; 64/1 S; 233/1 C; 403/365
[51] Int. Cl. ............................................. F16c 1/00
[58] Field of Search ............ 64/1 V, 2 R, 1 S, 1 R, 64/1 C, 6, 4; 233/1 C; 403/365, 333, 334, 375, 299

[56] References Cited
UNITED STATES PATENTS

| 1,872,962 | 8/1932 | Jones | 64/6 |
| 2,028,730 | 1/1936 | Tholl | 233/1 C |
| 2,404,385 | 7/1946 | Fritts | 403/365 |
| 2,465,471 | 3/1949 | Packer | 403/365 |
| 3,049,775 | 8/1962 | Ondeck | 403/365 |
| 3,328,976 | 7/1967 | Shoemaker et al. | 64/6 |
| 3,682,373 | 8/1972 | Mercier | 233/1 C |

FOREIGN PATENTS OR APPLICATIONS

| 272,987 | 6/1927 | United Kingdom | 64/1 R |
| 320,300 | 10/1929 | United Kingdom | 64/1 R |
| 549,718 | 10/1956 | Belgium | 64/1 V |
| 1,170,214 | 8/1959 | Germany | 64/1 R |
| 472,756 | 3/1950 | Italy | 64/1 R |

Primary Examiner—Samuel Scott
Assistant Examiner—Randall Heald
Attorney, Agent, or Firm—Kenway & Jenney

[57] ABSTRACT

A flexible shaft transmitting the rotational motion of a motor shaft to a rotor adapter is protected from deformation by a shaft protector which connects the flexible shaft to the motor shaft. The shaft protector is concentric about and completely protects the flexible shaft as it extends from the motor shaft to the rotor adapter. The end of the flexible shaft connected to the rotor adapter and the rotor adapter itself are free to move within the lumen defined by the shaft protector. The shaft protector, however, prevents permanent deformation of the flexible shaft by preventing the flexible shaft from bending to a point at which permanent deformation would occur.

In one important embodiment of the invention, a rotor adapter is provided with a plurality of grooves which prevent the rotor from jamming on to the rotor adapter.

11 Claims, 3 Drawing Figures

APPARATUS FOR TRANSMITTING ROTATIONAL ENERGY FROM A MOTOR TO THE ROTOR OF A CENTRIFUGE

CROSS REFERENCE TO RELATED APPLICATION

This application is a continuation-in-part of copending application Ser. No. 201,069 filed Nov. 22, 1971, now U.S. Pat. No. 3,779,451, by Ivan L. Lehman entitled "Flexible Shaft Stabilizer."

BACKGROUND OF THE INVENTION

The field of this invention is flexible shaft constructions employed to transmit rotational energy between a motor and the rotor of a centrifuge.

As the rotor of a centrifuge approaches a desired rotational speed, the shaft connecting the rotor to the motor usually passes through a phase known as the "critical speed" at which speed significant vibrations are encountered. As is apparent, it is desirable to provide centrifuges wherein vibrations are minimized to minimize the load on the motor bearings and to minimize the deleterious effects produced on a sample being centrifuged by such vibrations.

The speed at which significant amounts of vibration occur on a rotating centrifuge depends largely upon the geometry of the shaft as well as its elastic characteristics. For example, relatively stiff or thick short shafts encounter much more severe vibrations than do flexible or relatively long thin shafts. For this reason, it is advantageous to utilize flexible, relatively thin, long shafts as a means for translating the rotational energy of a motor shaft to the rotor of a centrifuge.

The foregoing construction is commonly included in centrifuges to be utilized for separating blood, because in blood separation, vibrational factors must be minimized. Unfortunately, however, a flexible shaft with a long, thin configuration is damaged easily, particularly while loading the centrifuge rotor with samples. To reduce the likelihood of such damage from occurring during the loading of the centrifuge rotor, it has been proposed that the rotating shaft be encased with a flexible material structured so that the flexible material contacts ball bearings which in turn contact a flexible race attached to a stationary housing. This construction is exemplified by the disclosure in U.S. Pat. No. 2,827,229. While the coupling remains flexible in the foregoing construction, this construction has two serious drawbacks. First, it is very expensive to produce because of the high precision with which a large number of parts must be assembled. Secondly, the bearings, within which the shaft rotates tend to confine the shaft, thereby reducing its flexibility and thereby increasing the vibration the shaft experiences while rotating at the critical speed.

Dampening means have also been proposed in order to reduce the vibrations encountered at the critical speed. For the most part, however, dampening means have proven unsatisfactory for reducing the overall vibrational effects on the samples in the centrifuge rotor.

In copending U.S. patent application Ser. No. 201,069 filed Nov. 22, 1971, by Ivan L. Lehman entitled "Flexible Shaft Stabilizer," the teachings of which are incorporated herein by reference, a construction is disclosed in which a flexible shaft is surrounded by a sleeve made from a resilient material such as natural or synthetic rubber. The resilient sleeve is enclosed by a tubular member fabricated of a non-resilient, structurally strong material, such as metal. Although the foregoing shaft construction provides improved results over prior art shaft construction in that the amount of vibration experienced by a rotor which is connected to a motor with this construction is reduced, that construction does not provide a completely satisfactory means for preventing the permanent deformation of the flexible shaft by an operator when loading and unloading the rotor.

SUMMARY OF THE INVENTION

The disadvantages of prior art shaft coupling for a centrifuge are significantly reduced by the shaft construction of the present invention which utilizes a long, thin, flexible shaft. The long, thin, flexible shaft, however, is enclosed by a shaft protector which is fabricated to allow the required amount of flexing of the flexible shaft but which prevents extreme bending of the shaft which might result in permanent deformation of the flexible shaft. In one important embodiment of the invention, the likelihood of flexible shafts being permanently deformed during rotor removal procedures is significantly reduced by a rotor adapter which includes a plurality of spaced grooves which prevent rotors from jamming or sticking to the rotor adapter.

DESCRIPTION OF THE PREFERRED EMBODIMENTS

Figure 1:
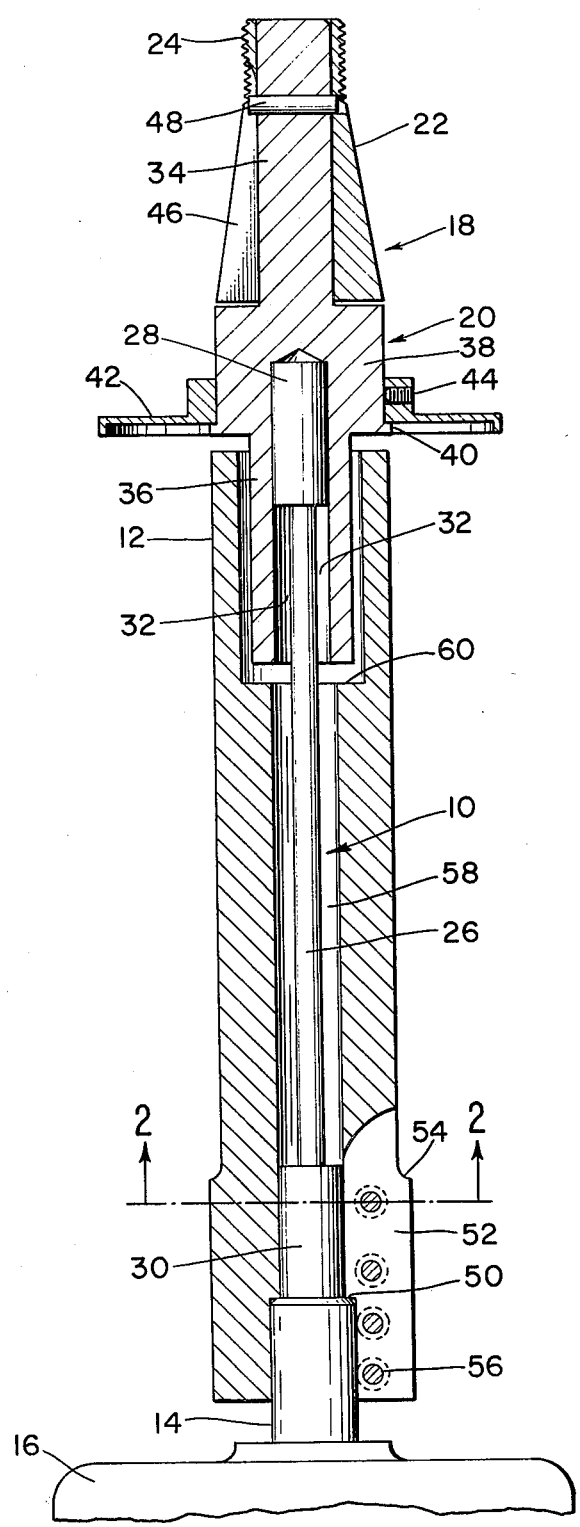
FIG. 1 is an elevational view, partially in cross section, of the shaft construction of the present invention.

At the outset, the invention is described in its broadest overall aspects with a more detailed description following. The present invention is a flexible shaft construction which transmits rotational energy from the shaft of a rotating motor to the rotor of the centrifuge. The shaft construction includes a long, thin, flexible shaft 10 which is protected by a shaft protector 12. In addition to protecting flexible shaft 10, shaft protector 12 provides coupling means between a rotating motor shaft 14 and the flexible shaft 10. The flexible shaft 10, shaft protector 12 and motor shaft 14 are connected in the manner described below so that there is no relative rotational motion between these members. Also shown in FIG. 1 is a motor 16. Motor 16 is a conventional motor of the type used in centrifuge construction and forms no part of the present invention.

The end of flexible shaft 10 opposite motor shaft 14 is inserted into a rotor adapter assembly 18. Rotor adapter assembly 18 is inclusive of two major components, a rotor adapter shaft 20 and an adapter taper sleeve 22. Rotor adapter assembly 18 supports a rotor (not shown). Since the rotor is conventional and forms no part of the present invention, it is not shown in the drawing. However, if a rotor were shown in the drawing, it would normally sit on taper 22. To secure the rotor to the rotor adapter assembly 18, taper sleeve 22 has threads 24 which accept a nut (not shown) which bears down against the rotor and thereby locks it to the adapter. From the foregoing, it should be apparent that rotational motion of motor shaft 14 will be translated by flexible shaft 10 to rotor adapter assembly 18 which in turn will cause a rotor to rotate at substantially the same speed as the motor shaft.

As is shown in FIG. 1, flexible shaft 10 is inclusive of a central member 26 and upper and lower end connectors 28 and 30. Upper end connector 28 makes physical contact with the rotor adapter assembly 18, and the lower end connector 30 makes physical contact with the shaft protector 12.

In one important embodiment of the invention, flexible shaft 10 is of unitary construction and is formed of a metal such as stainless steel. End connectors 28 and 30 are each 1.00 inches in length. Connector 28 has an outside diameter within the range of between 0.3765 to 0.3767 inches. The outside diameter of connector 30 is within the range of between 0.4998 to 0.5000 inches. At this point, it should be noted that it is possible for flexible shaft 10 to be constructed with a symmetric configuration with end connectors of equal outside diameters as well as equal lengths. The outside diameters of the connectors 28 and 30 on shaft 10 are controlled by the inside diameter of the element into which they are inserted. Furthermore, the outside diameter of end connector 30 is controlled to some degree by the diameter of motor shaft 14. In the present embodiment, the diameter of motor shaft 14 is slightly larger than the diameter of end connector 30.

The overall length of the entire flexible shaft 10 from the top end of upper shaft connector 28 to the opposite bottom end of lower connector 30 is approximately 6.25 inches. The length of central member 26 is 4.25 inches. To allow the flexible shaft 10 to flex properly, central member 26 has a diameter between the range of approximately 0.195 to 2.00 inches. Generally, the deformation on flexible shaft 10 caused by unequal loading is in the order of about 5/1000 of an inch from the axial center of shaft 10. During rotation, very little force is transmitted to the motor after the critical speed has been reached because the flexible shaft 10 becomes permanently deflected with the center of gravity of the centrifuge rotor being displaced over the axial center of the shaft 10. Although dimensions for flexible shaft 10 are set forth above, it should be understood that the description of such dimensions are to illustrate an example of the present invention and thus are not intended to limit the invention in any way. For example, in general, the flexible shaft 10 should be flexible and have a length of diameter ratio such that there is sufficient flexibility to permit self-balancing to occur without effecting yield stresses on the shaft. Preferably, the length to diameter ratio of central member 26 is between about 15 to 1 and 30 to 1. The central member of shaft 10 should be sufficiently flexible to permit its deformation without beng permanently deformed.

Figure 3:
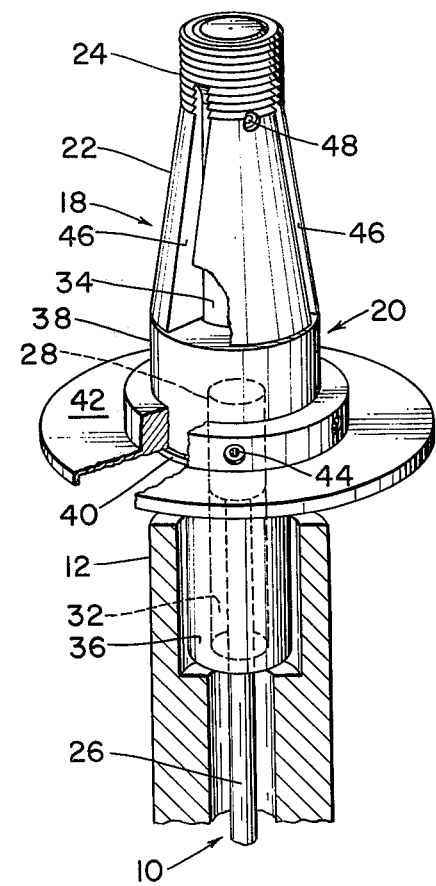
FIG. 3 is a perspective view of the rotor adapter of FIG. 1 and a sectional view of the portion of the shaft protector adjacent to the rotor adapter.

As is shown in FIG. 1 and 3, connector 28 of shaft 10 is connected to rotor adapter assembly 18. As is also shown in FIGS. 1 and 3, rotor adapter assembly 18 is formed from two components, a rotor adapter shaft 20 and an adapter taper sleeve 22. Connector 28 of flexible shaft 10 is inserted within the rotor adapter shaft component 20 of rotor adapter assembly 18.

To accept the upper end connector 28 of shaft 10, the rotor adapter shaft 20 is provided with a bore 32. The diameter of bore 32 is in a range between 0.3745 to 0.3755 inches. The upper end connector 28 of flexible shaft 10 is maintained within the bore 32 of rotor adapter assembly 18 by a friction fit. To assemble flexible shaft 10 and rotor adapter shaft 20, the following procedure has been found advantageous. Rotor adapter shaft 20 is heated to approximately 950°F for 30 minutes. Upper end connector 28 of flexible shaft 10 is cooled in liquid nitrogen for 15 minutes. Upper end connector 28 is inserted into bore 32 of rotor adapter shaft 20 while connector 28 is cool and while rotor adapter shaft 20 is hot. Of course, after the temperature of the flexible shaft and the rotor adapter shaft equalize, an excellent friction fit between these two components will result.

Rotor adapter shaft 20 is inclusive of upper shaft portion 34 and lower shaft portion 36. A central portion 38, which is wider than the upper and lower shafts 34, 36 separates the upper and lower shafts. A rim or shoulder 40 is formed on the bottom of central portion 38 to support a skirt 42. The rotor shaft 20 may be advantageously formed as a single unit from a metal such as titanium.

For the embodiment of the invention shown in FIG. 1, the outside diameter of lower shaft 36 is 0.69 inches. Bore 32 extends throughout the length of lower shaft 36 and into central portion 38. The length of bore 32 is 2.00 inches. When assembled into rotor adapter 18, the top of end connector 28 is inserted into the full 2.00 inches of bore 32. Thus, flexible shaft 10 extends from rotor adapter 18 a distance of 4.25 inches. The length of lower shaft portion 36 is 1.50 inches. The diameter of upper shaft portion 34 is between the range of 0.498 to 0.499 inches. The overall length of shaft 20 is 4.28 inches. The distance from the top of central portion 38 to the bottom of lower shaft portion 36 is 2.37 inches. Rim 40 is 0.06 inches thick. The outside diameter of rim 40 is 1.19 inches. The outside diameter of central portion 38 is between the range of 1.123 to 1.124 inches.

Skirt 42 is secured to the rotor adapter assembly 18 by one or more allen screws 44. The purpose of shirt 42 is to prevent materials from falling into the lumen defined by shaft protector 12 during operaton of the centrifuge.

As is shown in FIGS. 1 and 3, adapter taper sleeve 22 has a teepee-like configuration as viewed from the outside. Central portion 38 serves as a stop for supporting adapter taper sleeve 22. The adapter taper sleeve 22 is inclusive of a central axial bore which accepts upper shaft portion 34 of rotor adapter shaft 20. Threads 24 are formed on sleeve 22. Adapter taper sleeve 22 is also inclusive of three grooves 46 which extend lengthwise from the bottom of the sleeve to about the midway point of threads 24. Grooves 46 extend through the entire thickness of adapter taper sleeve 22 and are preferably spaced symmetrically about sleeve 22 a distance of 120° of arc from each other. Adapter taper sleeve 22 is maintained in proper position about rotor adapter shaft 20 by a roll pin 48 which extends through the thickness of upper shaft portion 34 and engages opposite sides of adapter taper sleeve 22. Preferably, adapter taper sleeve 22 is formed of a metal such as stainless steel. The purpose of the grooves 46 on the adapter taper sleeve 22 is to prevent permanent jamming of the rotor (not shown) on to the adapter assembly. Grooves 46 have a thickness between the range of approximately 0.124 to 0.129 inches. It has been found that these grooves insure that the taper will be removable without the likelihood of bending flexible shaft 10 when the rotor is removed. Thus, the slits on the taper allow the taper to flex so that the rotor does not lock or jam permanently on to Flexible shaft 10 is connected to shaft 14 of motor 16 by means of the shaft protector 12. As is shown in FIG. 14, the lumen defined by shaft protector 12 is stepped at 50. The diameter of the lumen of shaft protector 12 from step 50 to the bottom of the shaft protector is between the range of 0.6560 to 0.6566 inches and is 1.37 inches in length. The foregoing dimensions are designed to accommodate motor shaft 14. The diameter of the lumen of shaft protector 12 immediately above step 50 to step 60 is between the range of 0.4997 to 0.5004 inches and is sufficiently large to accomodate end connector 30, as well as to allow central member 26 to flex through the distances required to accomplish the objects of this invention. As is shown in FIG. 1, end connector 30 contacts motor shaft 14 although such contact is not critical.

Figure 2:
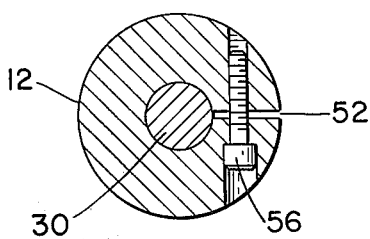
FIG. 2 is a cross-sectional view taken along line 2—2 of FIG. 1.

As is shown in FIG. 2, flexible shaft 12 has a slit 52 formed therein. Slit 52 extends through the wall of shaft 12 and runs along the length of protector 12 from the bottom of protector 12 to a point just above step 54. Slit 52 is about 0.062 inches wide. As is apparent from the foregoing, when slit 52 is closed by screws 56, motor shaft 14 and end connector 30 will be clamped tightly within the lumen of shaft protector 12. Thus, there is no relative rotational motion between end connector 30, motor shaft 14 or protector 12.

In addition to providing a coupling means for coupling motor shaft 14 to flexible shaft 10, shaft protector 12 also protects flexible shaft 10 from permanent deformation. To provide such protection, the lumen 58 of shaft protector 12 is designed to prevent bending of flexible shaft 10 to a point at which permanent deformation would occur while, at the same time, permitting flexible shaft 10 to flex through the distances required to eliminate severe vibrations. To accomplish the foregoing, the diameter of lumen 58 from step 50 to step 60 is between the range of 0.4997 to 0.5004 inches. The length of the lumen from the bottom of shaft protector 12 to step 60 is 5.50 inches and the overall length of the shaft protector is 7.00 inches. The diameter of the lumen from step 60 to the top of shaft protector 12 is 0.843 inches. The distance between the bottom of the shaft protector 12 and the top of step 54 is 2.47 inches. The outside diameter of shaft protector 12 from the bottom to the bottom edge of step 54 is 1.248 to 1.250 inches. The outside diameter of shaft protector 12 from the upper end of step 54 to the upper end of the shaft protector is 1.12 inches. Preferably, the shaft protector is formed of a metal such as aluminum.

As is shown in FIGS. 1 and 3, rotor adapter assembly 18 is free to move within the lumen defined by shaft protector 12. The clearance between the rotor adapter and the shaft protector governs the radial movement of the rotor adapter relative to the axis of rotation of the rotor shaft and prevents permanent deformation of the flexible shaft.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intend to be embraced therein.

I claim:

1. A construction for a centrifuge of the type which includes a flexible shaft to transmit the rotational motion of a motor shaft to a rotor, said flexible shaft having upper and lower connectors separated by a relatively long, thin central member, wherein the improvement comprises a shaft protector enclosing the central member of said flexible shaft, said shaft protector defining a lumen of a configuration such that the central member of the flexible shaft is free to flex within the lumen but which is sufficiently confining so as to prevent bending of the central member of the flexible shaft to a point which would result in permanent deformation of the flexible shaft, and a rotor adapter with the upper connector of the flexible shaft inserted in the rotor adaptor and the lower connector of the flexible shaft coupled to a motor shaft, and wherein there is a clearance between the rotor adapter and the shaft protector, which clearance governs the radial movement of the rotor adapter relative to the axis of rotation of the motor shaft and prevents the shaft from breaking due to a mechanical stress on the rotor.

2. The construction as set forth in claim 1 wherein the length to diameter ratio of the flexible shaft is selected so that there is sufficient flexibility to permit self-balancing to occur without affecting yield strength on the shaft.

3. The construction as set forth in claim 2 wherein the central member of the flexible shaft has a length to diameter ratio between the range of 15 to 1 to 30 to 1.

4. The construction as set forth in claim 3 wherein the shaft protector is a means for coupling the flexible shaft to the motor shaft.

5. The construction as set forth in claim 4 wherein said shaft protector has a vertical slit formed from the bottom thereof through the wall of the shaft protector which is urged toward a closed position by screws to form a clamp which engages: the lower connector on said flexible shaft, and said motor shaft to couple the motor shaft to the flexible shaft.

6. The construction as set forth in claim 4 wherein the rotor adapter comprises a central shaft member having a bore formed therein for receiving the flexible shaft; a taper on the shaft for supporting a centrifuge rotor, said taper having slits formed therein which extend along the length of the taper through the entire thickness thereof for preventing a rotor from becoming permanently jammed on to the taper.

7. The construction as set forth in claim 6 wherein said rotor adapter contains three slits spaced at 120° of arc from each other.

8. The construction as set forth in claim 7 also including an apron on said adapter for preventing material from entering the lumen defined by the shaft protector.

9. The construction as set forth in claim 6 wherein said flexible shaft, rotor adapter and shaft protector are formed of metal.

10. The construction as set forth in claim 3 wherein the ratio of said diameter to the diameter of said lumen is approximately 1 to 1.5.

11. The construction as set forth in claim 10 wherein said shaft is stainless steel and has a diameter of approximately 0.200 inch at the central member.

* * * * *

UNITED STATES PATENT AND TRADEMARK OFFICE
CERTIFICATE OF CORRECTION

PATENT NO. : 3,938,354
DATED : February 17, 1976
INVENTOR(S) : Ivan L. Lehman

It is certified that error appears in the above—identified patent and that said Letters Patent are hereby corrected as shown below:

Column 3, line 34, change "2.00" to --.200--;

Column 6, line 62, change "1.5" to --2.5--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks